United States Patent
Therkildsen et al.

(10) Patent No.: US 11,293,408 B2
(45) Date of Patent: Apr. 5, 2022

(54) ASSEMBLY FOR A WIND TURBINE, AND METHOD OF OPERATING AN ASSEMBLY FOR A WIND TURBINE

(71) Applicant: Vestas Wind Systems A/S, Aarhus N. (DK)

(72) Inventors: Claus Hald Therkildsen, Ryomgård (DK); Anders Haslund Liingaard, Hinnerup (DK)

(73) Assignee: Vestas Wind Systems A/S

(*) Notice: Subject to any disclaimer, the term of this patent is extended or adjusted under 35 U.S.C. 154(b) by 264 days.

(21) Appl. No.: 16/334,602

(22) PCT Filed: Aug. 21, 2017

(86) PCT No.: PCT/DK2017/050269
§ 371 (c)(1),
(2) Date: Mar. 19, 2019

(87) PCT Pub. No.: WO2018/054434
PCT Pub. Date: Mar. 29, 2018

(65) Prior Publication Data
US 2020/0332772 A1    Oct. 22, 2020

(30) Foreign Application Priority Data
Sep. 21, 2016 (DK) .............. PA 2016 70743

(51) Int. Cl.
*F03D 15/00* (2016.01)
*F03D 80/50* (2016.01)

(52) U.S. Cl.
CPC ............. *F03D 15/00* (2016.05); *F03D 80/50* (2016.05); *F05B 2240/60* (2013.01); *F05B 2260/30* (2013.01)

(58) Field of Classification Search
CPC ........ F03D 15/00; F03D 80/50; F03D 7/0248; F03D 7/0264; F05F 2240/60
See application file for complete search history.

(56) References Cited

U.S. PATENT DOCUMENTS 8,181,455 B2 * 5/2012 Tsutsumi ................ F03D 15/00
60/398
8,702,389 B2 * 4/2014 Wedekind ............. F03D 7/0224
416/26

(Continued)

FOREIGN PATENT DOCUMENTS

CN    203039518 U    7/2013
EP    1780409 A1     5/2007

(Continued)

OTHER PUBLICATIONS

Derksen, EP 2620636 A1 English Translation (Year: 2013).*

(Continued)

*Primary Examiner* — Michael L Sehn
(74) *Attorney, Agent, or Firm* — Wood Herron & Evans LLP

(57) ABSTRACT

An assembly for a wind turbine, comprising a shaft extending within a main shaft housing. A radially outer portion of the shaft includes at least one engagement formation. A retention mechanism is moveable radially between a radially inward position in which the retention mechanism can engage the at least one engagement formation, such that rotation of the shaft is constrained, and a radially outward position in which the retention mechanism cannot engage the engagement formation, thereby allowing rotation of the shaft.

19 Claims, 19 Drawing Sheets

(56) References Cited

U.S. PATENT DOCUMENTS

2012/0070304 A1   3/2012  Nielsen et al.
2015/0219073 A1   8/2015  Baumgaertel

FOREIGN PATENT DOCUMENTS

EP      2620636 A1    7/2013
WO   2010102967 A2    9/2010

OTHER PUBLICATIONS

European Patent Office, International Search Report and Written Opinion in PCT/DK2017/050269, dated Nov. 8, 2017.
Danish Patent and Trademark Office, Search and Exam Report in PA 2016 70743, dated Mar. 28, 2017.

\* cited by examiner

ASSEMBLY FOR A WIND TURBINE, AND METHOD OF OPERATING AN ASSEMBLY FOR A WIND TURBINE

FIELD OF INVENTION

The present invention relates to an assembly that enables the constraining of rotation of a shaft within a housing of a wind turbine.

The invention has been developed primarily to allow rotational locking of a main shaft of a wind turbine to allow technicians to safely work on, or in the vicinity of, the turbine and its components, and embodiments are described with this application in mind. It will be appreciated, however, that the invention may be deployed for other reasons and in other forms.

BACKGROUND

A wind turbine typically includes a tower topped with a nacelle. In one type of wind turbine, the nacelle includes a housing having at least two axially spaced apart bearings. A shaft extends through, and is supported by, the bearings for rotation relative to the housing. Typically, one end of the shaft extends outside the nacelle and supports the turbine hub.

The other end of the shaft is connected to a gearbox and/or other drivetrain and power generation components.

Wind turbines generate power by converting rotational energy to electrical energy. Especially for large turbines, the amount of torque generated may be substantial. Blades of the turbine may be feathered to reduce torque, but even then, swirls and gusts of wind may cause unpredictable rotation of the turbine.

A locking mechanism may be used to positively prevent rotation of the shaft when it is desired to work on the turbine. One such lock requires a locking hub to be mounted on the shaft between the housing and the hub. The locking hub is a radial flange with holes that can be engaged by locking pins mounted to the outside of the housing. Such a locking hub takes up valuable space in the nacelle and may itself be a potential source of injury.

SUMMARY

In accordance with the invention, there is provided an assembly for a wind turbine, comprising:
a main shaft housing;
a shaft extending within the main shaft housing, a radially outer portion of the shaft comprising at least one engagement formation; and
a retention mechanism moveable radially between:
  a radially inward position in which the retention mechanism can engage the at least one engagement formation, such that rotation of the shaft is constrained; and
  a radially outward position in which the retention mechanism cannot engage the engagement formation, thereby allowing rotation of the shaft.

The engagement formation may comprise at least one recess in an outer surface of the shaft. The assembly may comprise a plurality of the recesses circumferentially spaced apart in the outer surface of the shaft.

The retention mechanism may include at least one locking element, wherein:

in the radially inward position, a portion of the or each locking element is at least partly engaged with a corresponding one of the at least one recesses; and
in the radially outward position, the portion of the or each locking element is disengaged from the corresponding recess.

The or each locking element may be a pin. The main shaft housing may comprise an aperture for the or each pin, the or each pin being slideably mounted within its corresponding aperture.

The or each locking element may be a pawl mounted to pivot between the radially inward and radially outward positions.

The assembly may comprise a plurality of the locking elements and a plurality of the recesses.

The or each locking element may be a tapered fit in the, or at least one of, the corresponding recess or recesses. The tapered fit may be in the circumferential direction, such that as the or each locking element moves towards the radially inward position, the tapered fit causes a gradual decrease in the amount of rotational play between the shaft and main shaft housing.

When the or each locking element is in the radially inward position, there may be substantially no rotational play between the shaft and main shaft housing, at least partly as a result of the tapered fit.

The tapered fit may be at least partly due to a taper along at least a portion of the or each locking element.

The tapered fit may be at least partly due to a taper within at least a portion of an interior of the or each recess.

The main shaft housing may further comprise:
a first bearing; and
a second bearing axially spaced apart from the first bearing;
wherein the shaft is at least partly supported by the first bearing and the second bearing for rotation relative to the main shaft housing, and the retention mechanism is positioned between the first bearing and the second bearing.

The locking elements and/or recesses may be configured and/or arranged such that the locking elements can only be moved into the radially inward position for a single rotational position of the shaft.

The relative circumferential spacing of the locking elements and recesses may be such that all the locking elements can only be moved into the radially inward position for a single rotational position of the shaft.

The cross-sectional shapes, sizes and/or orientations of the locking elements and recesses are such that all the locking elements can only be moved into the radially inward position for a single rotational position of the shaft.

The assembly may further comprise an actuator configured to selectively move the retention mechanism between the radially inward and radially outward positions. The actuator may be hydraulic, electromagnetic, magnetic, or electrical.

BRIEF DESCRIPTION OF DRAWINGS

Embodiments of the invention will now be described, by way of example only, with reference to the accompanying drawings, in which.

DETAILED DESCRIPTION

Figure 1:
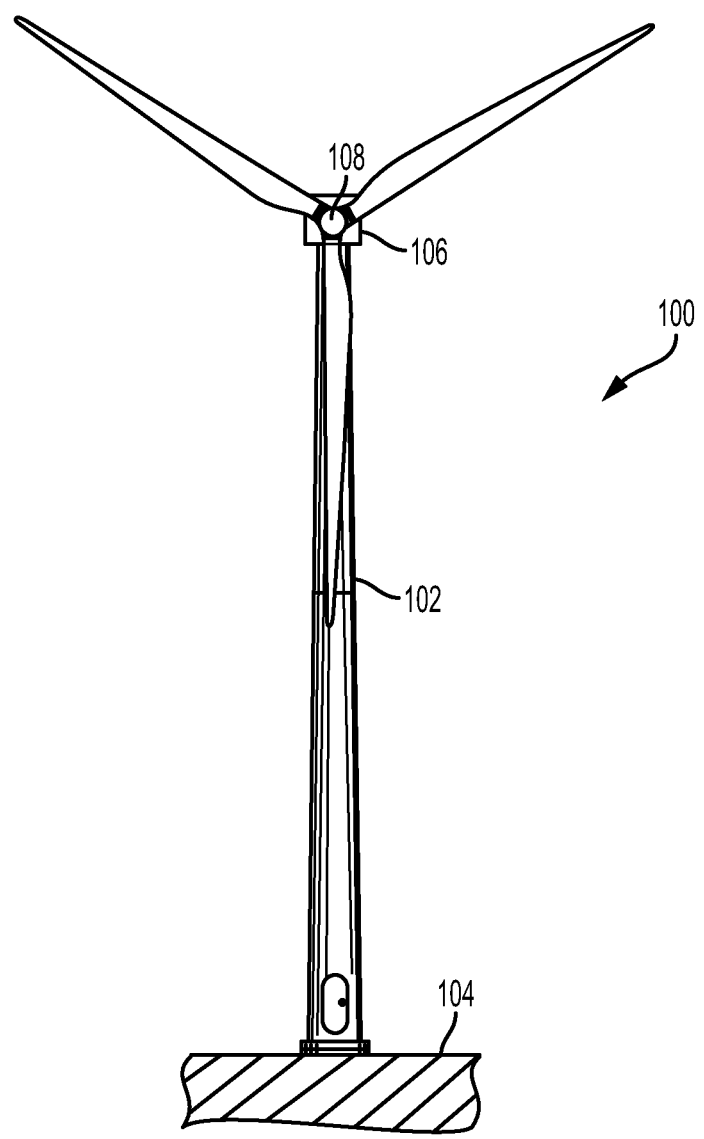
FIG. 1 is a front elevation of a wind turbine, comprising an assembly according to the invention.

Referring to FIG. 1, there is shown a wind turbine 100. The wind turbine 100 includes a generally vertical tower 102 mounted to a foundation 104, which may be on the land, or wholly or partially underwater. The tower 102 supports a nacelle 106. A rotor 108 is mounted to a shaft (not shown) for rotation about a horizontal axis, to convert wind into rotational energy. The nacelle 106 houses a generator (see FIG. 2) along with other mechanical and electrical systems to support the conversion of the rotational energy into electrical energy.

Figure 2:
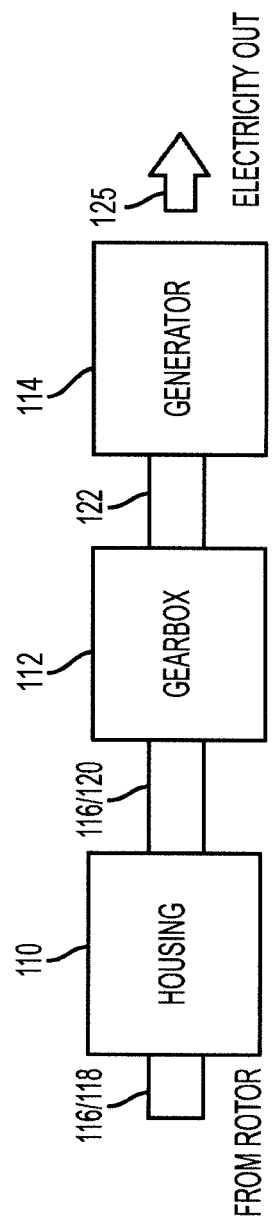
FIG. 2 is a schematic of a drivetrain of the wind turbine of FIG. 1.

The nacelle 106 houses a number of functional components. Turning to FIG. 2, the nacelle can include a main shaft housing 110, a gearbox 112 and a generator 114. A main shaft 116 extends through the main shaft housing 110, and is supported for rotation on bearings as described below. An input portion 118 of the shaft 116 is connected to, and driven by, the rotor 108 (see FIG. 1). An output portion 120 of the shaft 116 provides input drive to the gearbox 112. The gearbox 112 steps up the rotational speed via internal gears (not shown) and drives a gearbox output 122. The gearbox output 122 in turn drives the generator 114, which converts the rotation of the gearbox output 122 into electricity 125. The electricity 125 generated by the generator may then be converted by other components (not shown) as required before being supplied to, eg, the grid. So-called "direct drive" wind turbines that do not use gearboxes are also known. The gearbox may therefore be considered optional.

The gearbox 112, generator 114, and other components (not shown) may need to be serviced, maintained and repaired. Doing so while the rotor is turning may be dangerous or impossible. The kinetic and electrical energy generated by the rotor turning may make it dangerous for any activity to be undertaken in or near the main shaft housing, gearbox, generator and other components. Even if the blades of the wind turbine are feathered, it is still possible for swirls and gusts of wind to cause the rotor to rotate, which may endanger technicians.

Figure 3:
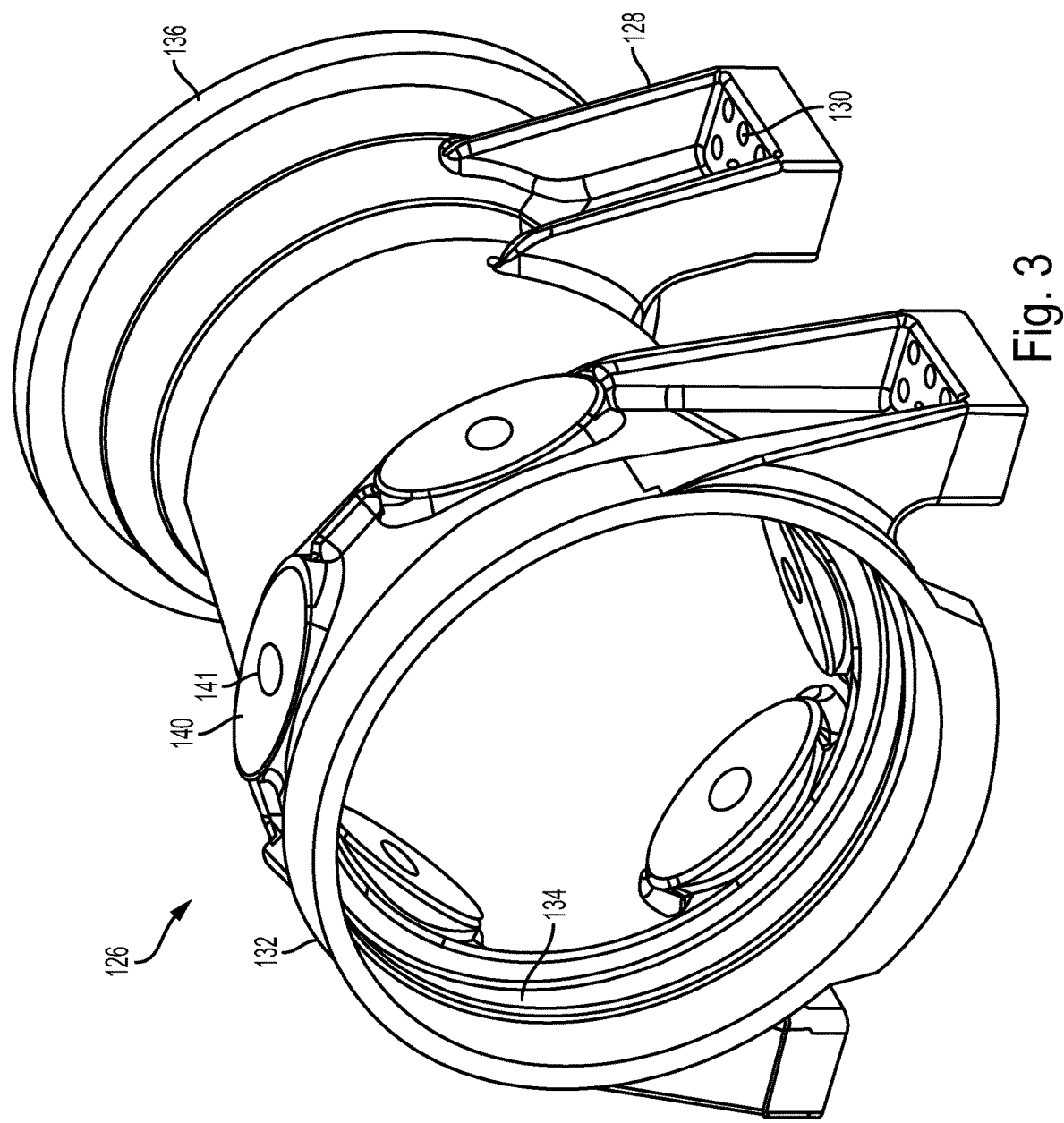
FIG. 3 is a perspective view of a housing forming part of an assembly according to the invention.
Figure 4:
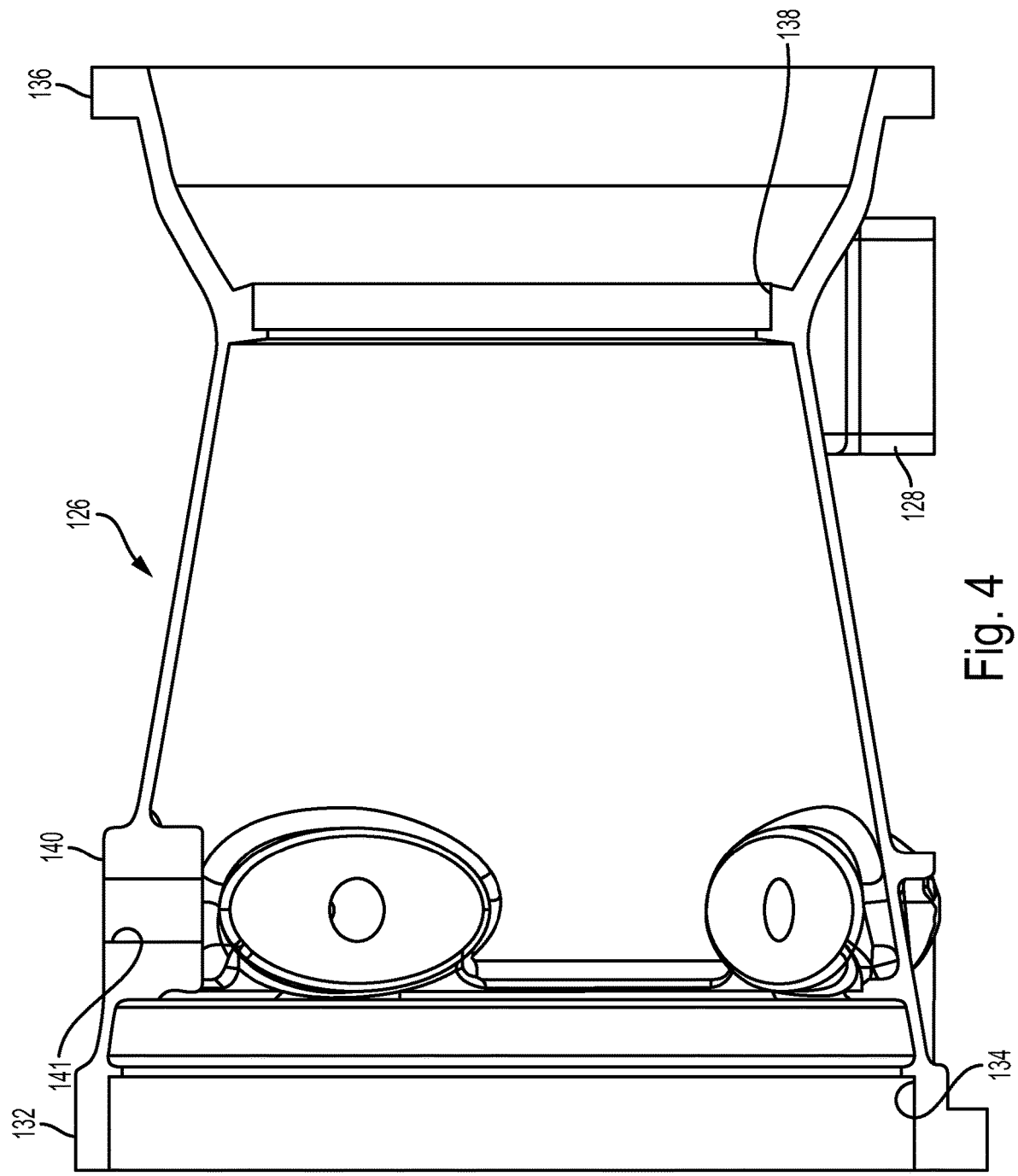
FIG. 4 is a longitudinal section of the housing of FIG. 3.
Figure 5:
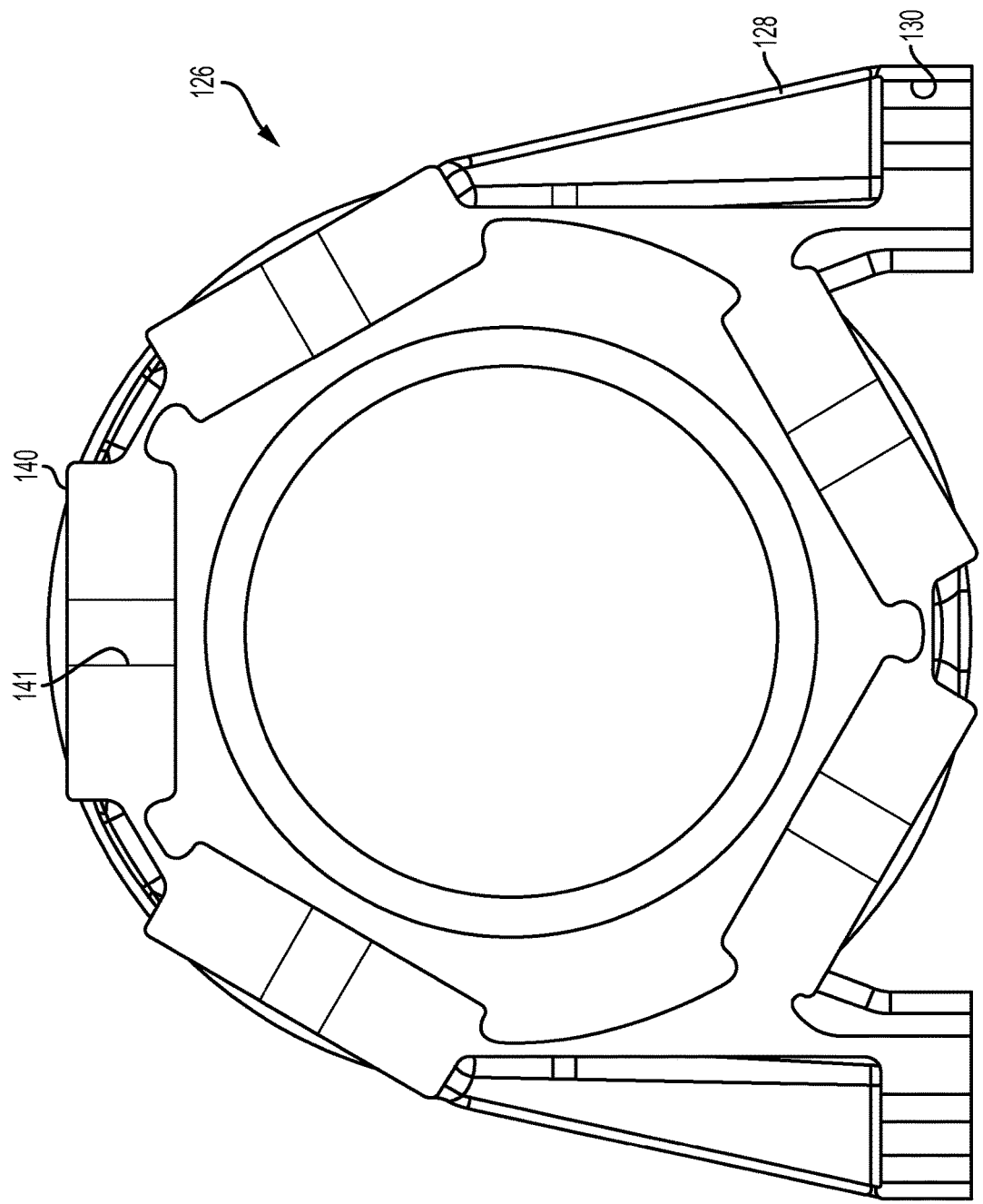
FIG. 5 is a cross section of the housing of FIG. 3.
Figure 6:
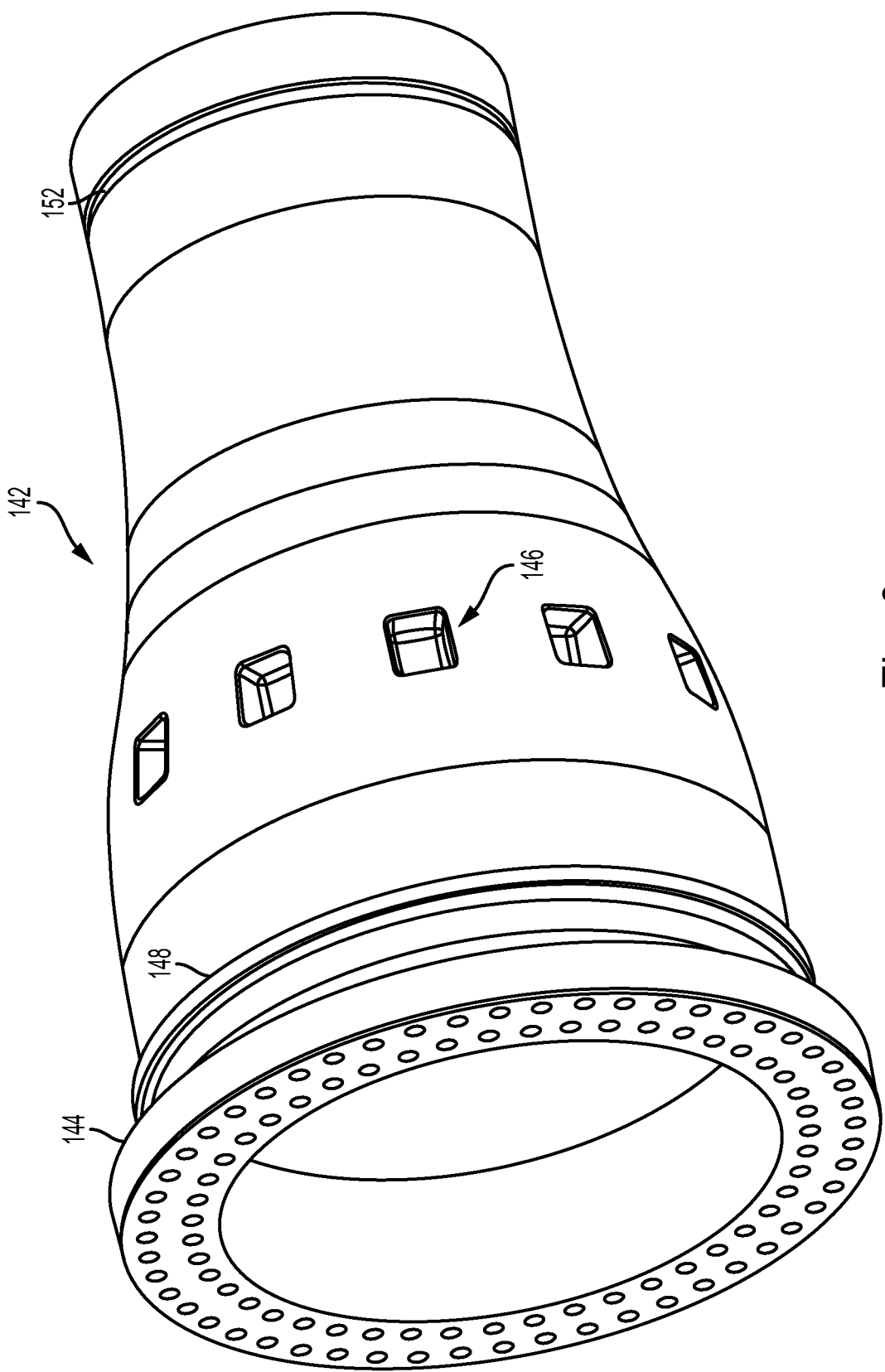
FIG. 6 is a perspective view of a shaft for installation in the housing of FIG. 3 and forming part of an assembly according to the invention.
Figure 7:
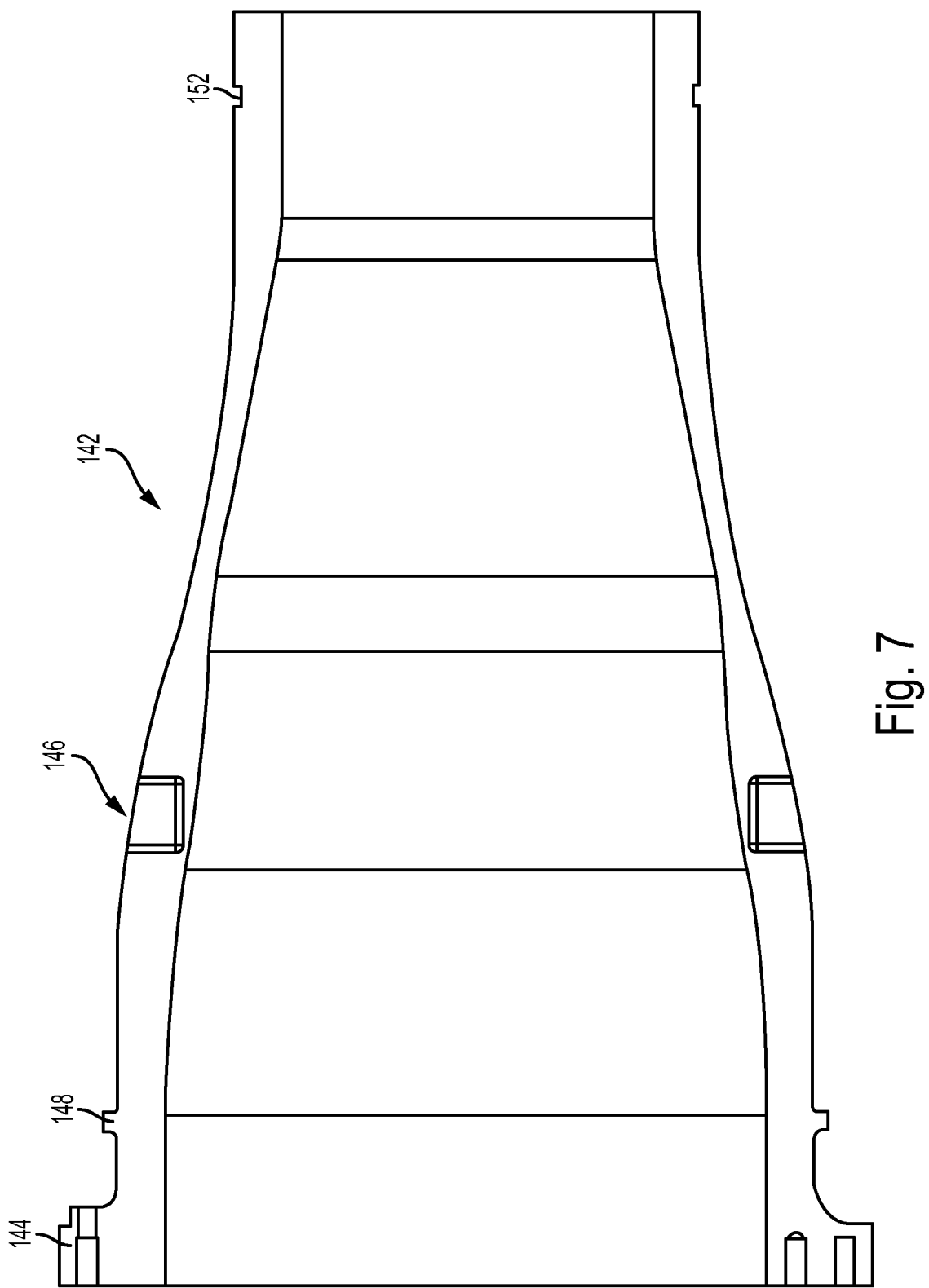
FIG. 7 is a longitudinal section of the shaft of FIG. 4.
Figure 8:
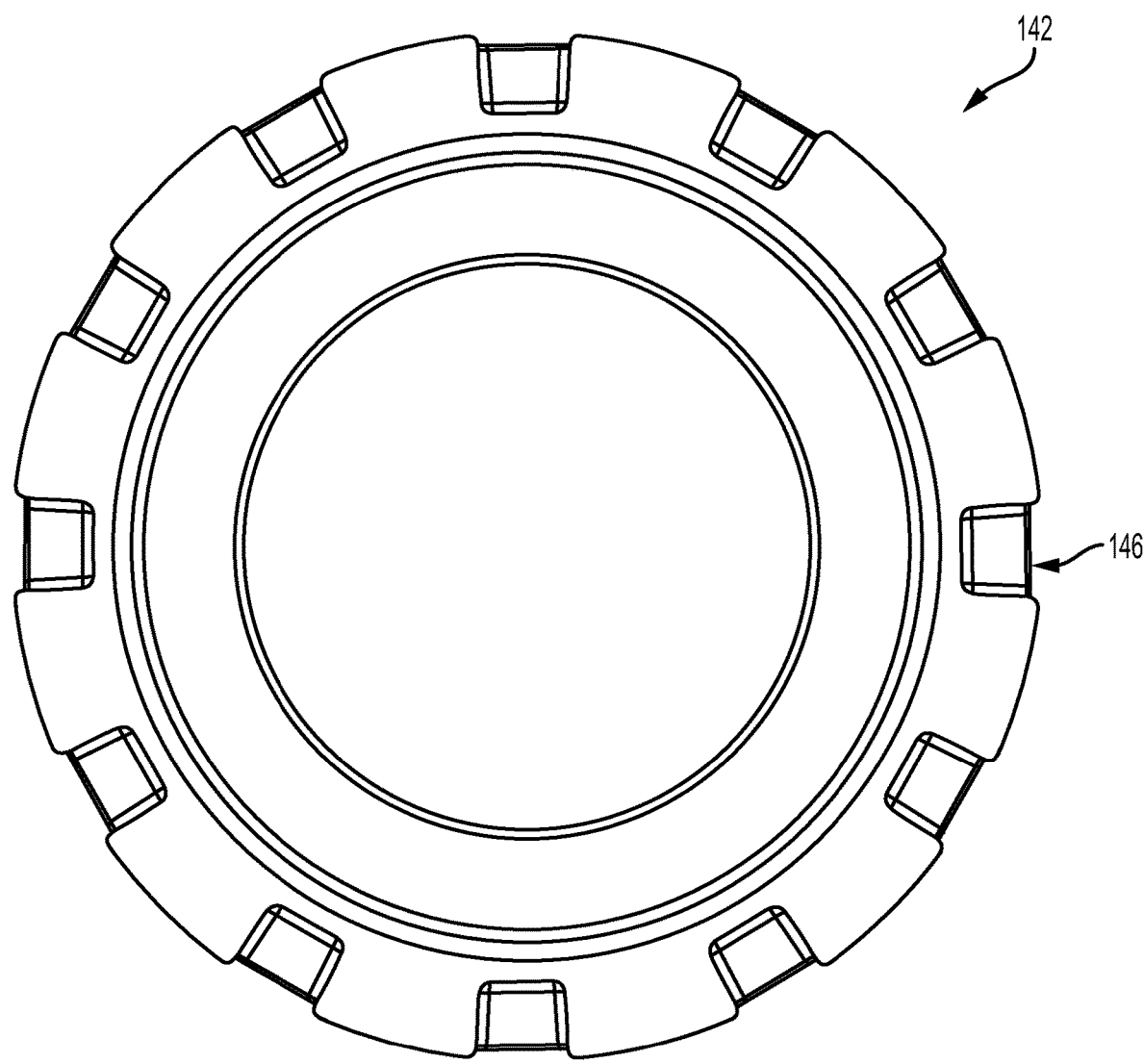
FIG. 8 is a cross section of the shaft of FIG. 4.

FIGS. 3 to 5 show a practical embodiment of the main shaft housing 126 that corresponds to the housing 110 shown in FIG. 2. From now on the main shaft housing will now simply be referred to as the 'housing'. It should be appreciated that the term main shaft housing is meant as the main structural and supporting component for the main shaft of the wind turbine. Here the shaft 142 extends through and is supported by the housing 126 and so the loads on the shaft are transferred to the superstructure of the wind turbine. In the illustrated embodiment the main shaft housing incorporates bearing means to rotatably support the shaft, and this will be described below. As such, the main shaft housing may also be considered to be, and may be referred to as, a main bearing housing. In principle, however, it should be understood that the main shaft housing may include a single bearing supporting one end of the shaft, or bearings may be provided external to the housing as part of a separate component, for example as part of a floor-mounted support structure, as part of the hub, or as part of the gearbox adjacent the shaft.

As best shown in FIG. 3, the housing 126 comprises struts 128 having bolt holes 130 for bolting the housing to a support frame, for example a base frame or bed plate (not shown), within the nacelle 106. The housing 110 includes a front flared portion 132 defining a front bearing seat 134, and a rear flared portion 136 defining a rear bearing seat 138. A number of circumferentially spaced apart bosses 140 are positioned axially adjacent the front bearing seat 134, between the front bearing seat 134 and the rear bearing seat 138. Each of the bosses 140 includes an aperture in the form of a radially extending cylinder 141 for receiving a pin (as described in more detail below). The bosses 140 may be formed during manufacture of the housing, or they may be manufactured separately and then attached to the housing by any known means, such as welding, brazing, bonding, or with fasteners such as bolts.

Figure 9:
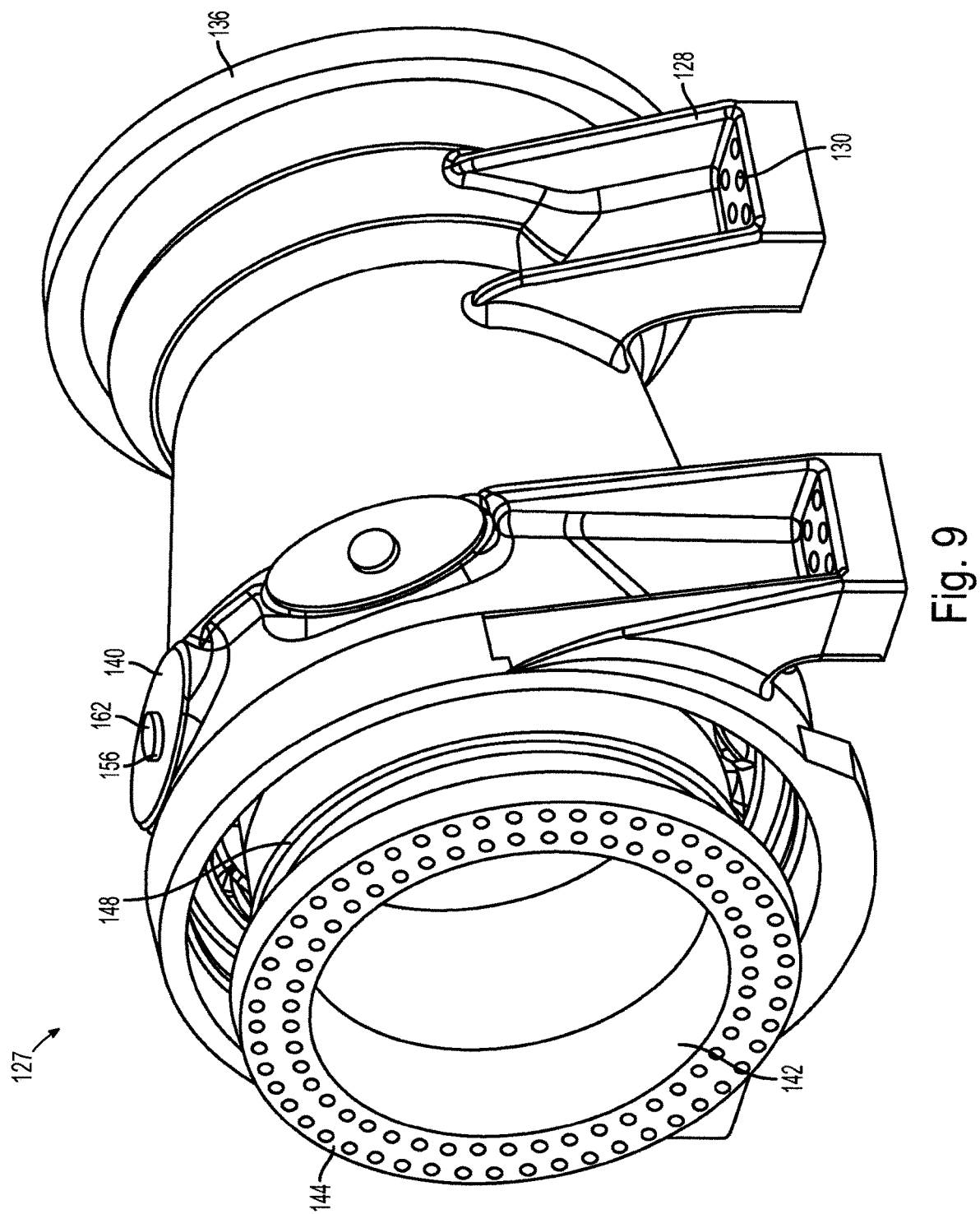
FIG. 9 is a perspective view of the housing of FIG. 3 and the shaft of FIG. 6, assembled to form an assembly according to the invention.
Figure 10:
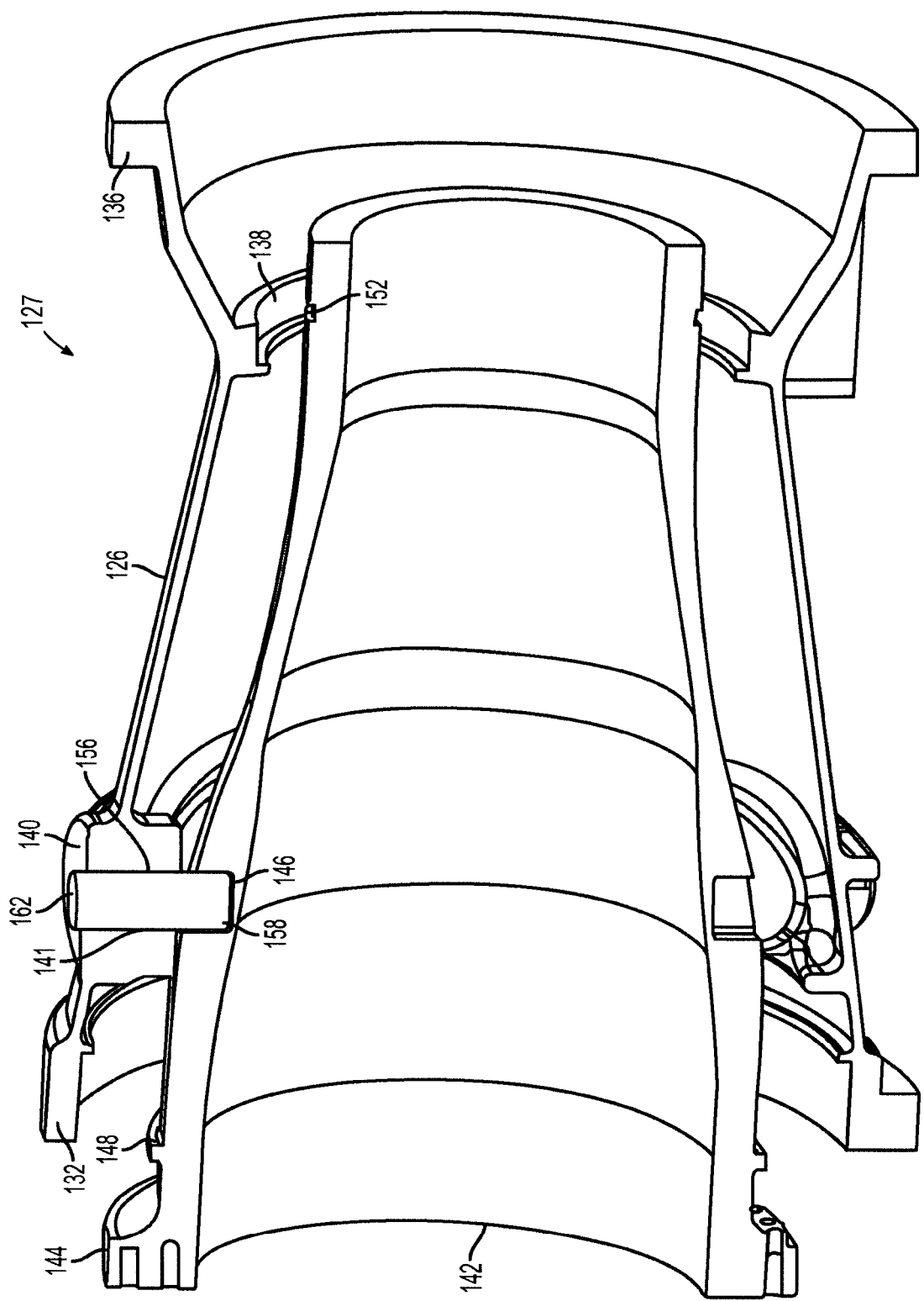
FIG. 10 is a perspective view of a longitudinal section of the assembly of FIG. 9.
Figure 11:
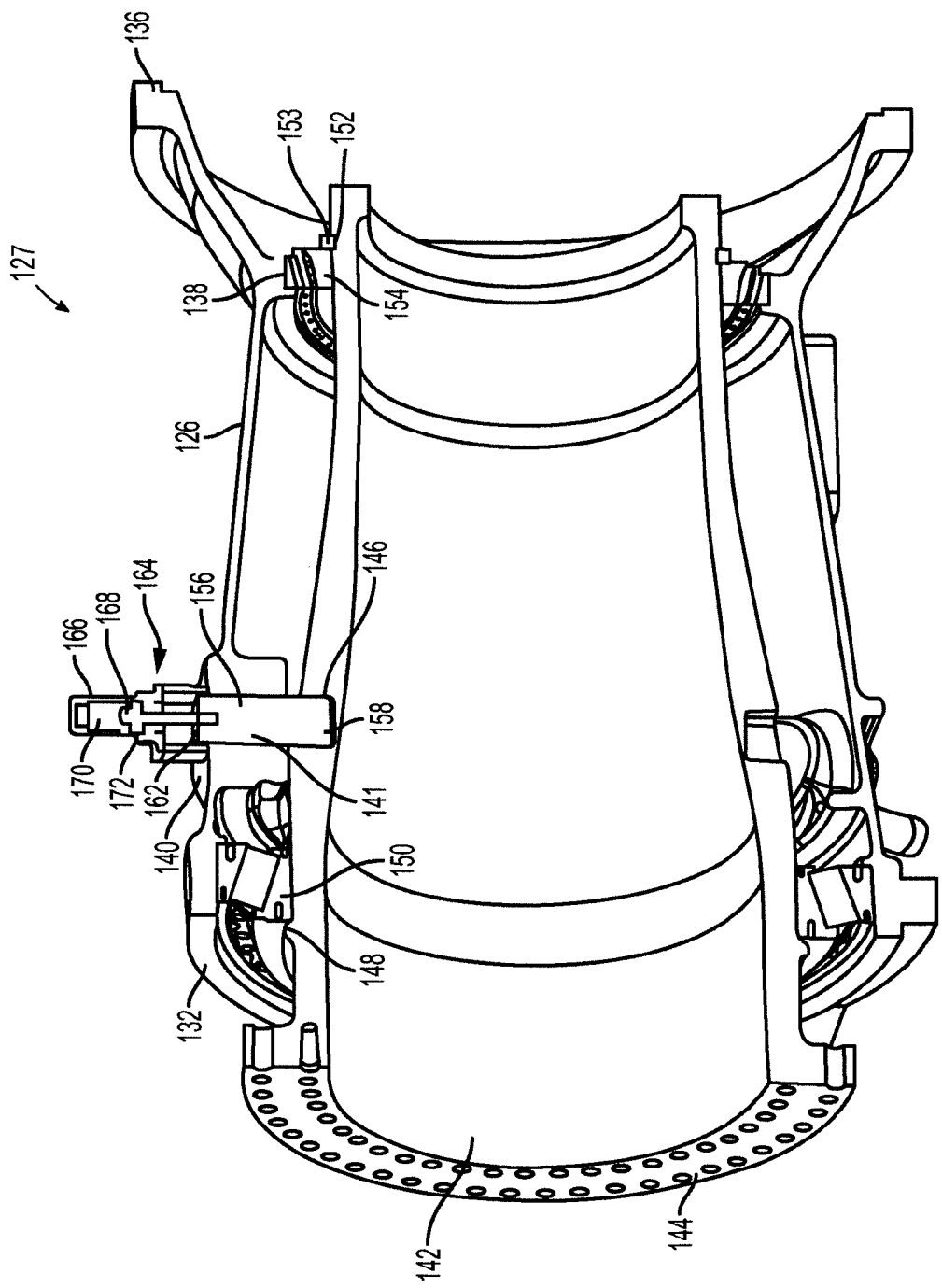
FIG. 11 is an alternative perspective view of the longitudinal section of FIG. 10, including a hydraulic actuator.

Turning to FIGS. 6-11, there is shown a shaft 142 (corresponding with main shaft 116 in FIG. 2) for installation within the housing 126 to form an assembly 127 as shown in FIGS. 9 to 11. The shaft 142 includes a flange 144 to which a rotor hub (not shown) may be bolted, either directly or via an intermediate shaft (not shown). The shaft 142 includes several engagement formations in the form of circumferentially spaced apart recesses 146 in an outer surface of the shaft 142. As best shown in FIG. 11, the shaft 142 includes a front bearing retainer 148 for retaining a front bearing 150 in the front bearing seat 134 and a rear bearing retainer groove 152 for holding a rear bearing clip 153 that holds a rear bearing 154 in the rear bearing seat 138. For the sake of clarity, the front bearing 150, rear bearing 154, and rear bearing clip 153 have been omitted from all figures other than FIG. 11.

The shaft 142 is tapered along its length from the front, and in the illustrated embodiment tapers from a relatively wide front end to a relatively narrow end. This allows for a larger front bearing 150 and greater surface area for the front bearing seat 134 and front bearing retainer 148, which allows for better support for the relatively heavier rotor end of the shaft 142.

Figure 12:
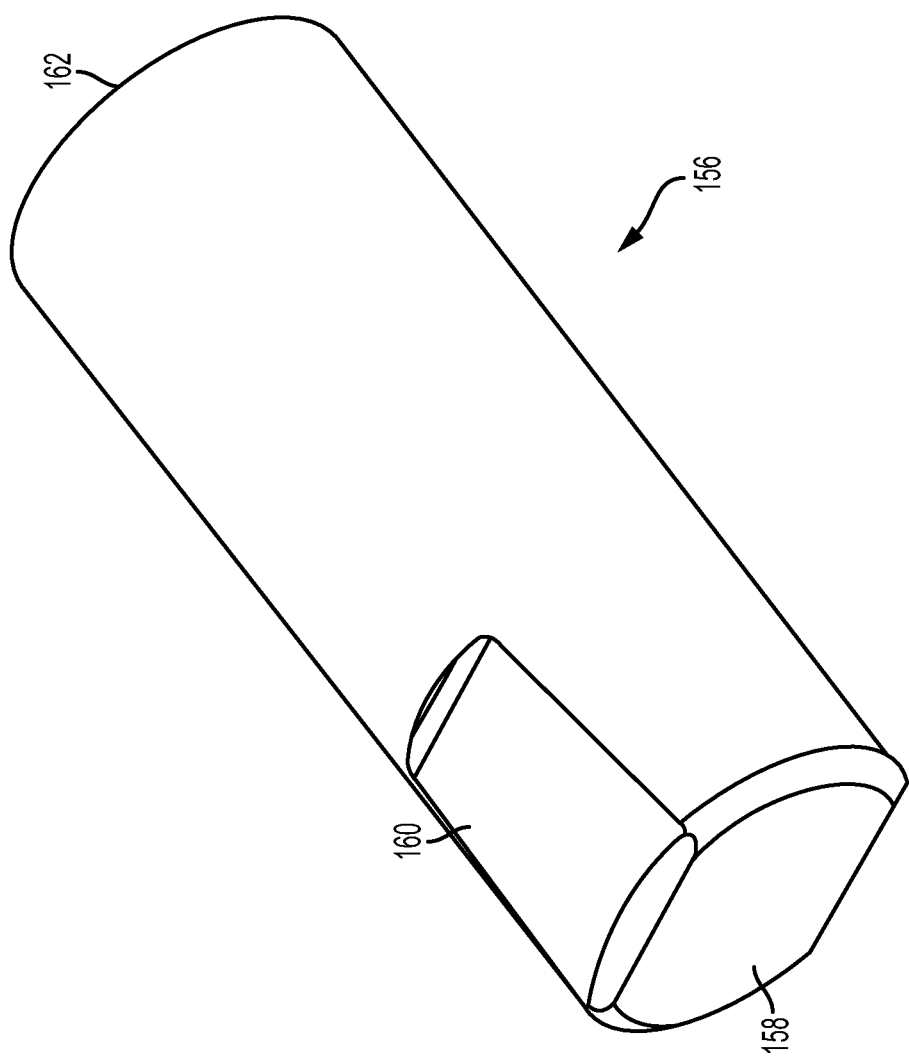
FIG. 12 is a perspective view of a pin for use with the assembly of FIG. 9.

Turning to FIG. 12, there is shown a locking element in the form of a pin 156. The pin 156 includes a radially inner end 158. The radially inner end 158 in this embodiment is tapered by way of chamfered portions 160. A radially outer end 162 of the pin 156 is generally circular in section, to allow it slide radially within one of the cylinders 142 (see FIGS. 9 to 11). Each pin 156 can slide between a radially inward position in which the pin 156 can engage with a corresponding recess 146, and a radially outward position in which the pin 156 cannot engage the corresponding recess 146. When the pins 156 are in the radially inward position, rotation of the shaft is constrained by the interaction of the radially inner ends 158 of the pin 156 with the interior of the corresponding recesses 146. When the pins 156 are in the radially outward position, the radially inner ends of the pins 156 no longer interact with the corresponding recesses 146, thereby allowing rotation of the shaft. The word "radially" in the terms "radially inward" and "radially outward" means that there is a radial component to the movement, rather than the movement being solely radial. For example, a pivot or hinge may provide a movement that is partly radial and partly axial (see embodiment of FIGS. 17A and 17B, for example).

The optionally narrowed inner end 158 of the pin 156 as shown in FIG. 12, along with the complementary taper of the recess 146, results in each pin 156 being a tapered fit in its corresponding recess 146. In the embodiment illustrated, the tapered fit is in the circumferential direction, such that as the pin 156 moves towards the radially inward position, the tapered fit causes a gradual decrease in the amount of rotational play between the shaft 142 and housing 126. In at least some embodiments, when the pin 156 is in the radially inward position, there is substantially no rotational play between the shaft 142 and housing 126, at least partly as a result of the tapered fit.

FIGS. 20A, 20B, 20C and 20D show alternative non-exhaustive examples of how a tapered fit between a pin 156 and its corresponding recess 146 may be achieved. In all these examples, the pin 156 is shown in the radially inward position.

Figure 20A:
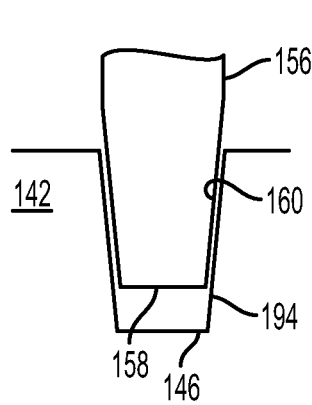
FIGS. 20A to 20D are schematic cross sections of alternative examples of the pin and recess described in relation to the embodiment of FIGS. 3 to 12.

In FIG. 20A, both the pin 156 and recess 146 are tapered, with the recess 146 having sloping sides 194. This is the arrangement used in the embodiment shown in FIGS. 3 to 12. In this embodiment, the tapers of the pin 156 and recess 146 approximately match each other, so as to provide a relative large contact area between them when the pin 156 is in the radially inward position. However, in other embodiments, the angles of the taper of the pin 156 and recess 146 may be different to each other. If the pin 156 is not quite centred in the recess 146 as the pin 156 starts moving towards the radially inward position, the first sloping portion 198 will initially engage an adjacent outer edge 200. This causes rotation of the shaft 142 as the pin 156 continues to move in a radially inward direction, until the opposite outer edge 200 engages its adjacent sloping portion 198. Once this position is reached, there is substantially no rotational play between the shaft 142 and housing 126.

Figure 20B:
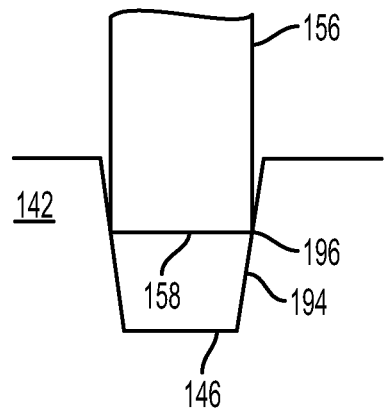

Turning to FIG. 20B, in another embodiment, the recess 146 is tapered, but the pin 156 is not. Edges 196 at the radially inner end 158 of the pin 156 engage the sloping sides 194 of the recess 146. If the pin 156 is not quite centred in the recess 146 as it starts moving towards the radially inward position, a first of the edges 196 will initially engage an adjacent sloping side 194. This causes rotation of the shaft 142 as the pin 156 continues to move in a radially inward direction, until the opposite edge 196 engages its adjacent sloping side 194. Once this position is reached, there is substantially no rotational play between the shaft 142 and housing 126.

Figure 20C:
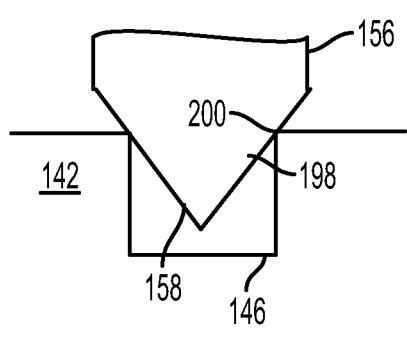

Turning to FIG. 20C, in another embodiment, the pin 156 is tapered, but the recess 146 is not. Sloping portions 198 at the radially inner end 158 of the pin 156 engage outer edges 200 of the recess 146. If the pin 156 is not quite centred in the recess 146 as it starts moving towards the radially inward position, a first of the sloping portions 198 will initially engage an adjacent outer edge 200. This causes rotation of the shaft 142 as the pin 156 continues to move in a radially inward direction, until the opposite outer edge 200 engages its adjacent sloping portion 198. Once this position is reached, there is substantially no rotational play between the shaft 142 and housing 126.

Figure 20D:
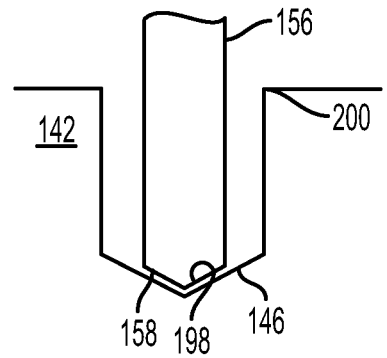

Turning to FIG. 20D, in another embodiment, the pin 156 has a similar sectional shape to that in FIG. 20C, but is narrower (in a direction of the shaft's circumference) than the recess 146. If the pin 156 is not quite centred in the recess 146 as it starts moving towards the radially inward position, a first of the sloping portions 198 will initially engage an adjacent outer edge 200. This causes rotation of the shaft 142 as the pin 156 continues to move in a radially inward direction, until the pin 156 can drop into the recess 146. The pin 156 then continues moving towards the radially inward position, again causing rotation of the shaft 142 until the pin 156 reaches the position shown in FIG. 20D. Once this position is reached, there is substantially no rotational play between the shaft 142 and housing 126.

Although the illustrated examples show symmetrical tapering on both sides of the pin 156 and/or recess 146, the skilled person will understand that the tapering may not be symmetrical. Different angles may be used on alternate sides of the pin 156 and/or recess 146. In some embodiments, only one side of the pin 156 and/or recess 146 is angled to provide the required taper.

Figure 21:
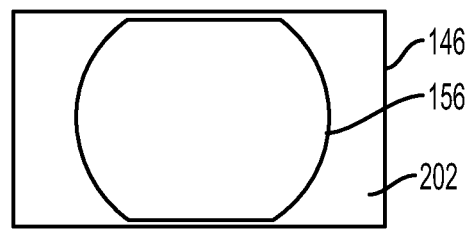
FIG. 21 is a schematic plan view of the pin and recess described in relation to the embodiment of FIGS. 3 to 20.

The tapering so far described has been in the circumferential direction. This enables the shaft 142 to be locked with little or no rotational play. As shown in FIG. 21, in such embodiments, the pin 156 and recess 146 may be configured and sized such that there are axial spaces 202 on both sides of the pin 156 when it is in the radially inward position. For example, the recess 146 may be axially longer than the pin 156. This allows for greater tolerances in the axial direction, thereby avoiding the tolerance chain complexity that would be involved if the recess 146 and pin 156 were designed to be of axially similar length. Making the recess 146 axially (relative to the shaft 142) longer than the axial width of the pin 156 reduces the chance of the pin 156 placing an axial load on the shaft 142 via the recess 146 when moved into the radially inward position.

In alternative embodiments, the pin 156 and recess 146 may be configured and sized such that there is a relatively high tolerance axial fit between them, and/or there may be a tapered fit in the axial direction as has been described in relation to the circumferential direction.

The skilled person will understand that the term "taper" includes any suitable combination of straight and curved portions in longitudinal cross section.

The skilled person will understand that the tapered fit between the pin 156 and recess 146 described with reference to the examples shown in FIGS. 20A to 20D may be applied to any other locking element and/or embodiment described herein. In some embodiments, the tapered fit may only be used in a subset of the locking element/engagement formations pairs.

FIG. 11 shows the assembly of FIG. 10, with a hydraulic actuator 164 installed on the boss 140. Although only one actuator 164 is illustrated, it will be appreciated that each boss 140 is provided with its own actuator 164. Each actuator 164 includes a hydraulic cylinder 166 and piston 168. The radially inner end of the piston 168 is attached to the radially outer end 162 of the pin 156.

Hydraulic lines (not shown) selectively supply hydraulic fluid under pressure to the outer side 170 or the inner side 172 of the piston 168. As will be understood by the skilled person, providing hydraulic fluid under pressure to the outer side 170 of the piston 168 drives the piston 168 radially inwardly. If the radially inner end 158 of the pin 156 is adjacent a recess 146, it will engage the recess as shown in FIGS. 10 and 11. As described above, when the pins 156 are in this position, rotation of the shaft 142 is constrained by the interaction of the radially inner ends 158 of the pin 156 with the interior of the corresponding recesses 146. Providing hydraulic fluid under pressure to the inner side 172 of the piston 168 drives the piston radially outwardly. As described above, when the pins 156 are in this position, the radially inner ends of the pins 156 no longer interact with the corresponding recesses 146, thereby allowing rotation of the shaft 142.

The retention mechanism (such as the pins 156 in the presently described embodiment) may be spring-loaded into either the radially inward or radially outward position. In that case, hydraulic pressure need only be supplied to overcome the force of the spring. This reduces the need for two-way hydraulics.

The assembly 127 may be designed such that the pins 156 are controlled to move inwardly only when the shaft 142 is stationary or moving relatively slowly. As explained above, the amount of torque generated by a wind turbine may be significant, and it may not be desirable to allow the pins 156 to move into the radially inward position while the shaft is rotating with any significant speed. Rotation of the shaft may be controlled by a brake (not shown), which may be applied after the blades have been feathered to reduce the amount of torque generated.

Alternatively or in addition, the shaft may be driven, for example by an electric motor, to a position in which the recesses 146 align with corresponding pins 156, which enables the pins 156 to be moved into the radially inner position.

Figure 13:
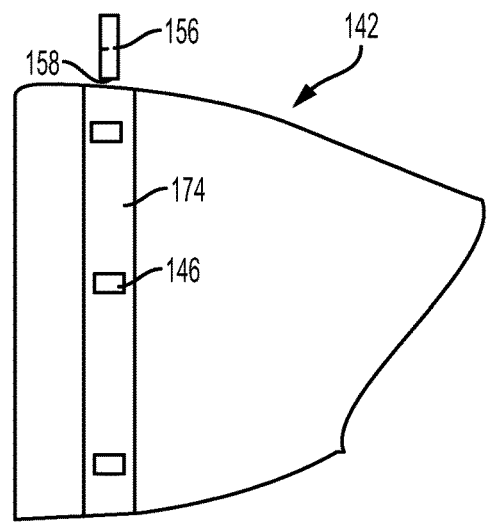
FIG. 13 is a simplified side elevation of a shaft comprising a circumferential region.
Figure 14A:
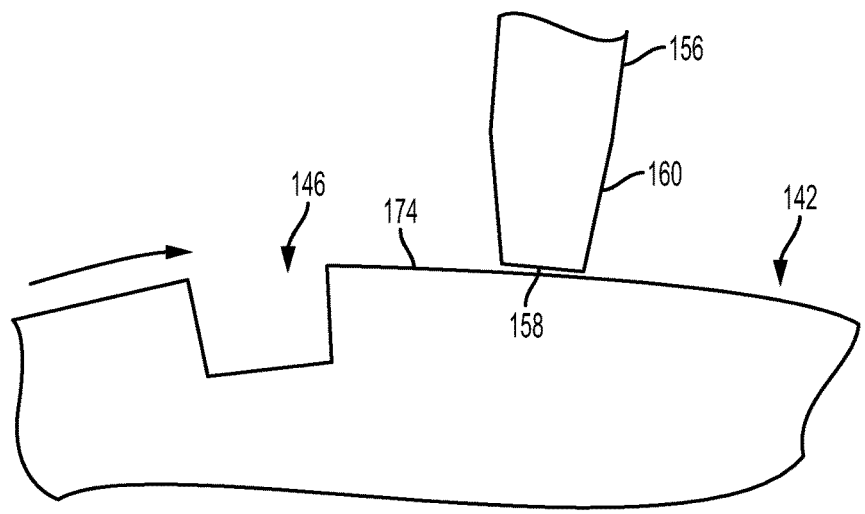
FIGS. 14A and 14B show a simplified partial cross sectional view of a pin and recess of the shaft of FIG. 13.
Figure 14B:
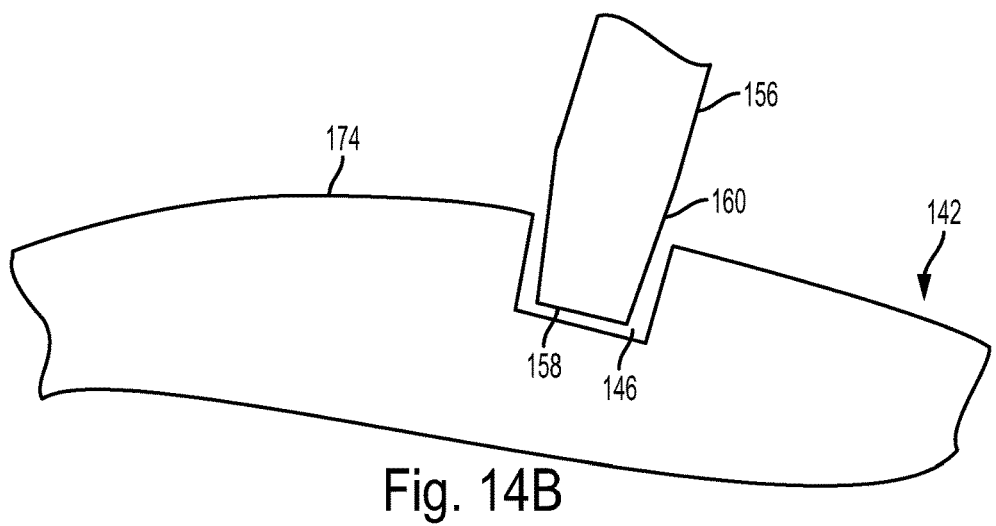

Alternatively or in addition, and as shown in FIGS. 13, 14A and 14B, the shaft 142 may include a circumferential region 174 on its outer surface. If the pins 156 and recesses 146 are not aligned when the pins 156 are being urged in a radially inward direction, the radially inner end 158 of each pin 156 may engage an adjacent area of the circumferential region 174, as shown in FIG. 14A. As the shaft 142 rotates (whether under its own momentum or as a result of being actively rotated), the radially inner end 158 slides along the circumferential region 174. When a recess 146 and a pin 156 align, the pin 156 drops into the recess 146, as shown in FIG. 14B.

In the embodiments so far described, it will be noted that the bosses 140, and therefore the pins 156, are not equally spaced around the housing 126. The spacing of the bosses 140, however, is such that when any pin 156 aligns with a recess 146, all the other pins also align with a recess 146. In this case, not all recesses 146 will receive a pin 156. Alternatively, there may be equal numbers of recesses 146 and pins 156, or more recesses 146 than pins 156, in which case all recesses 146 may receive a pin 156 when the shaft 142 is at one or more particular rotational positions.

The shaft 142 may be lockable only at a particular rotational position. It is possible for technicians to achieve this result by only moving the pins 156 into the radially inward position when the shaft 142 is in the correct rotational position. Alternatively, the pins 156 and/or recesses 146 may be configured and/or arranged such that the pins 156 can only be moved into the radially inward position for a single rotational position of the shaft 142.

A simple example of such an arrangement is where only a single pin 156 and recess 146 is provided. Where a greater number of pins is desired, the relative circumferential spacing of the pins 156 and recesses 146 may be such that all the pins 156 can only be moved into the radially inward position for a single rotational position. This may be achieved, for example, by arranging the pins 156 and/or recesses 146 such that they are rotationally asymmetric.

Figure 15A:
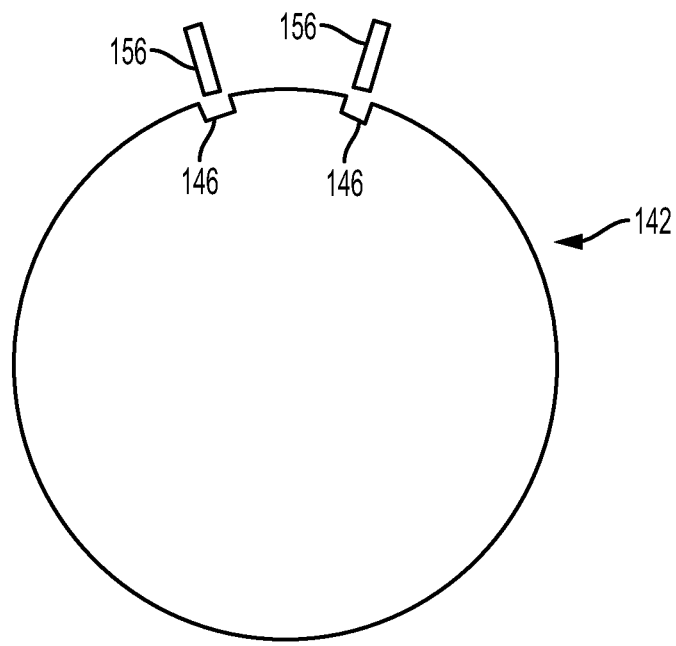
FIG. 15A is a simplified cross section of a shaft and pins in which the shaft can only be locked in one rotational position.
Figure 15B:
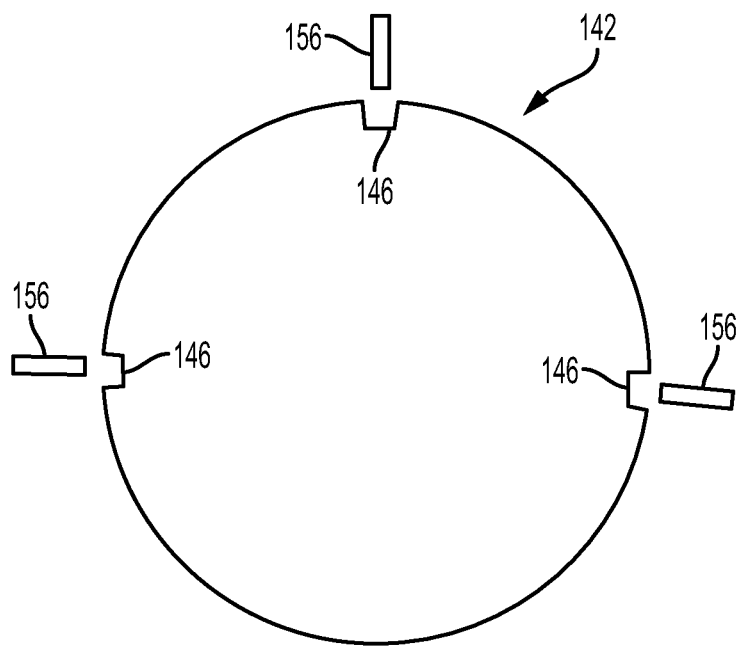
FIG. 15B is a simplified cross section of a shaft and pins in which the shaft can only be locked in one rotational position.

FIGS. 15A and 15B schematically show two examples of such an arrangement.

In FIG. 15A, two pins 156 are provided relatively close to each other, and corresponding recesses 146 are provided on the shaft 142. In this example, the pins 156 may be interlocked, linked or joined to each other, such that the pins 156 can only move radially inwards when both are simultaneously aligned with a corresponding recess 146 (that is, if only one of the pins 156 is aligned with a recess 146, neither of the pins 156 can move radially inwards). For example, the pins 156 (or their corresponding pistons 168, if hydraulic actuators are used) may be physically connected by way of a frame, web, bracket or other physical connector, which in turn may be mounted so as to slide, pivot or rotate in such a way that the pins 156 can only move inwardly when all pins 156 are free to move. That is, if any of the pins 156 cannot move inwardly because there is no radially adjacent corresponding recess 146, then all pins 156 are prevented from moving inwardly.

In FIG. 15B, the pins 156 are also positioned in a rotationally asymmetric layout. However the pins 156 are more widely circumferentially distributed around the housing 126 compared to the pins 156 in FIG. 15A. This may help spread the stresses on the shaft 142 and housing 126. As with the embodiment of FIG. 15A, the pins 156 may be interlocked, linked or joined to each other, such that the pins 156 can only move radially inwards when all are aligned with a corresponding recess 146. Such functionality may also, or in addition, be realised by a suitably configured hydraulic actuation and control system.

Figure 15C:
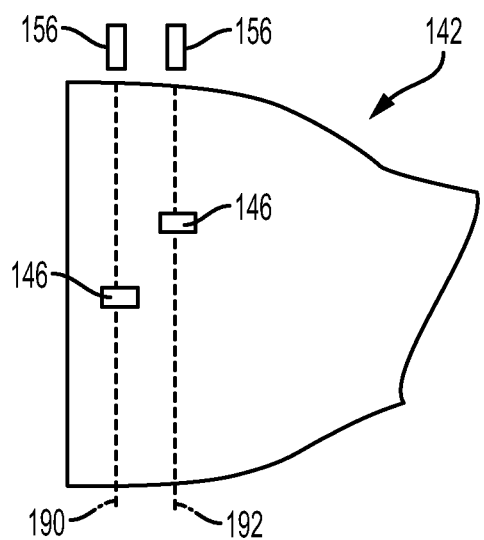
FIG. 15C is a simplified side elevation of a shaft comprising two axially offset recesses.
Figure 15D:
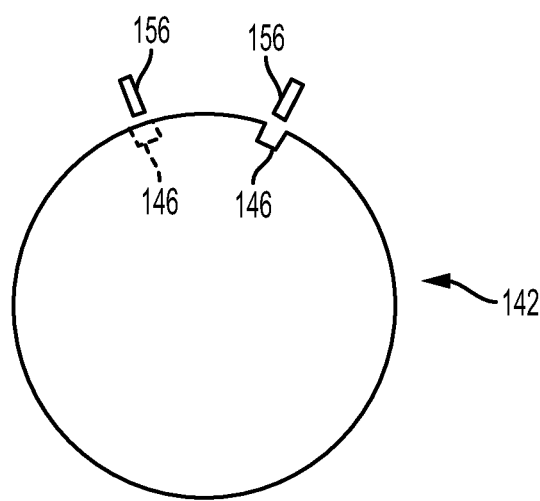
FIG. 15D is a simplified partial cross sectional view of the shaft of FIG. 15C.

In other embodiments, at least some of the pins 156 and their corresponding recesses 146 are axially offset relative to at least some other pins 156 and their corresponding recesses 146. For example, as shown in FIGS. 15C and 15D, the pins and their corresponding recesses may be provided in two spaced apart axial positions 190 and 192 on the housing 126 and shaft 142. This enables the same size and shape pins 156 and recesses 146 to be used while still allowing the shaft 142 to be locked in only a single rotational position. More than two spaced apart axial positions may be provided.

Figure 16:
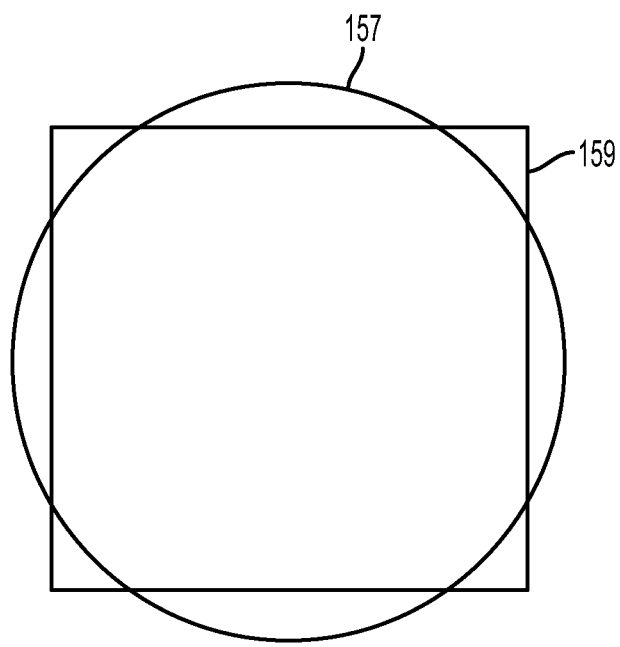
FIG. 16 is schematic showing overlaid cross sections of a circular recess and a square recess.

The ability to allow the shaft 142 to be locked in only a single rotational position may also be achieved in other ways. For example, each pin 156 may have a particular cross sectional shape or size that matches only the cross section of one of the recesses 146; that is, each pin 156 may be keyed to fit one, and only one, recess 146. In an example with two pins 156, one may be circular in cross section while the other is square in cross section. The relative sizes of the square and circular cross sections is such that the square pin cannot move into the round recess and the round pin cannot move into the square recess. FIG. 16 shows the relative sizes of a circular recess 157 and a square recess 159. Since only a circular pin (not shown) of suitable size can fit into the circular recess 157, and only a square pin (not shown) of suitable size can fit into the square recess 159, there is only a single rotational position for which the circular and square pins may engage their respective recesses 157 and 159. In this embodiment, it is not necessary for the pins and recesses to be positioned rotationally asymmetrically in order to ensure that the shaft 142 can be locked in only one rotational position.

The skilled person will appreciate that, with suitable adjustments, any embodiment described as allowing the shaft 142 to be locked at one rotational position may also be used in embodiments where the shaft 142 may be locked in more than one rotational position.

The preceding embodiments describe a locking element in the form of an elongate pin 156. The pin may have a different longitudinal- or cross-sectional profile, form, or shape as compared with the illustrated pin 156. The skilled person will appreciate that the locking elements (or element, if there is only one) may also take other forms.

Figure 17A:
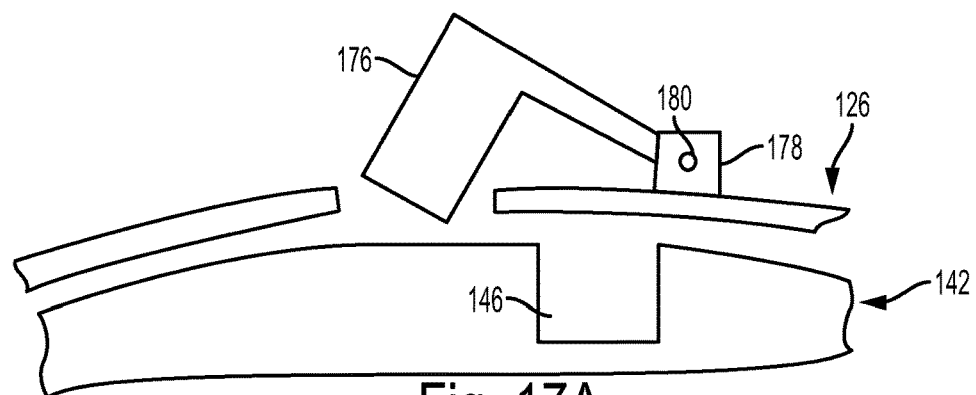
FIGS. 17A and 17B are simplified partial cross sectional views of an assembly comprising a locking element in the form of a pawl.
Figure 17B:
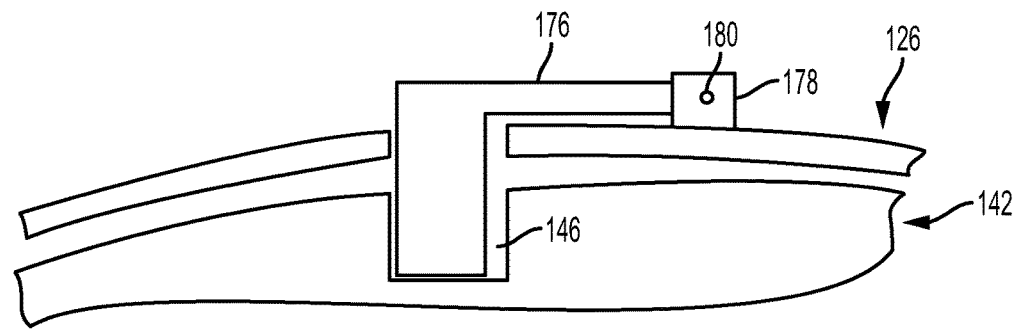

As shown in FIGS. 17A and 17B, the locking element may take the form of a pawl 176 mounted to the housing 126 by way of a bracket 178 and hinge 180. FIG. 17A shows the pawl 176 in the radially outward position, in which the shaft 142 is free to rotate. FIG. 17B shows the pawl 176 in the radially inward position, in which the pawl 176 engages the recess 146 to prevent the shaft 142 from rotating. Although the hinge 180 is shown with an axial hinge axis, the hinge axis may be at any suitable angle that allows sufficient radial hinging of the pawl 176. Any other form of flexure may be used in place of the hinge. For example, a flexible mount may be used to provide the required amount of radial movement of the pawl 176. As with previous embodiments, the pawl may be provided with an actuator.

Figure 18A:
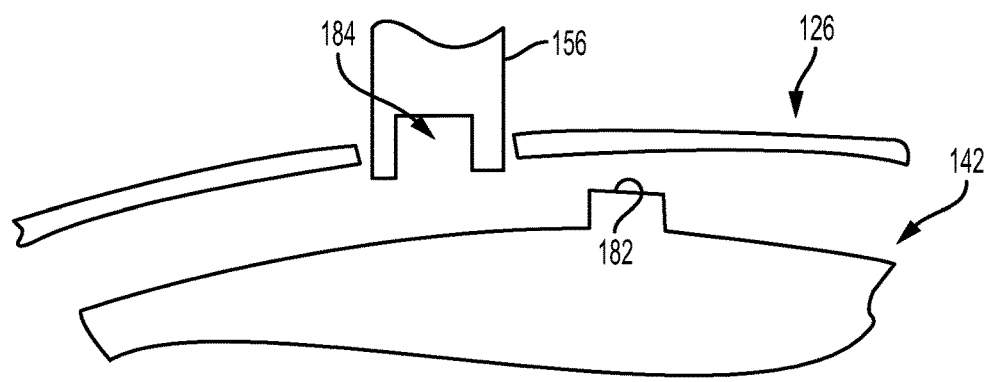
FIGS. 18A and 18B are simplified partial cross sectional views of an assembly comprising an engagement element in the form of a boss.
Figure 18B:
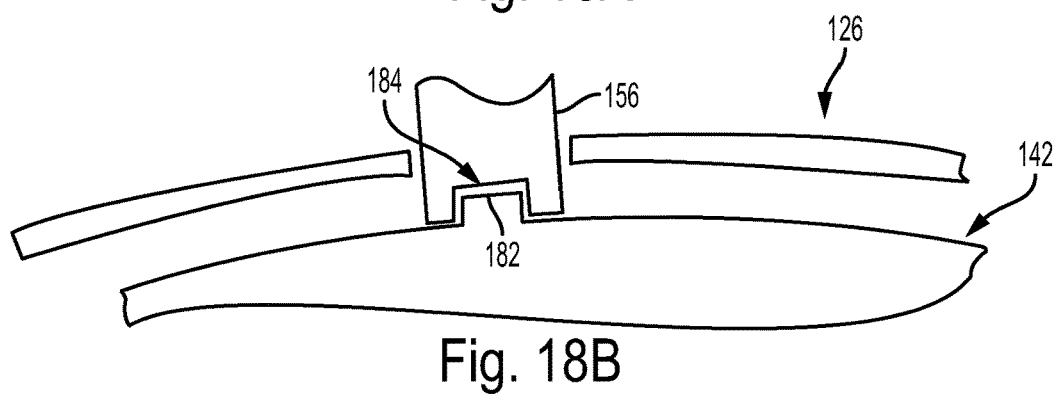

The preceding embodiments describe an engagement formation in the form of a recess 146. The skilled person will appreciate that the engagement formations (or formation, if there is only one) may take other forms. The engagement formations may extend radially outwardly from a radially outer surface of the shaft. For example, the engagement formations may take the form of bosses, ribs or other raised formations. The locking element 156 may include a hollow, recess or other radially extending space that allows it to engage a corresponding boss, rib or other raised formation. For example, as shown in FIGS. 18A and 18B, the engagement formation may take the form of a boss 182. In this embodiment, the pin 156 includes a radial hollow 184. FIG. 18A shows the pin 156 in a radially outward position, in which the shaft 142 is free to rotate. FIG. 18 B shows the pin 156 in a radially inward position, in which the boss 182 engages the hollow 184 to prevent the shaft 142 from rotating.

The formations may be moulded, machined or additively manufactured onto an outer surface of the shaft 142. The formations may also be manufactured separately and then welded, bonded, fastened or otherwise attached to the shaft.

The skilled person will understand that the engagement formations may include a combination of recesses and radially outwardly extending formations.

The skilled person will also understand that either or both of the engagement formations and locking elements may take the form of bosses, splines, ribs, grooves, slots, depressions, channels, cups, loops, cantilevers, fingers, brackets and/or any other structure(s) that provide axially-aligned radial edges or surfaces that can interact to prevent rotation of the shaft 142 when the retention mechanism is in the radially inward position.

Although the previously described actuator 164 is hydraulic, it will be appreciated that the actuator may take any other suitable form. For example, the actuator may be hydraulic, electric, magnetic, mechanical, or any combination thereof. An individual actuator may be provided for each locking element (where locking elements are used), or each actuator may operate more than one of the locking elements. For example, mechanical connections between locking elements may allow more than one of them to be moved between the radially inward and radially outward positions by a shared actuator.

The use of an actuator is optional. The retention mechanism may manually moveable between the radially inward and radially outward positions, for example by a technician using his/her hands or a suitable tool.

A lock (not shown) may be provided to maintain the retention mechanism in the radially inward position or in the radially outward position, or selectively in either position.

The skilled person will understand that the invention has application in wind turbines that use configurations other than those with a housing 126 having a first bearing 150 and a second bearing 154. For example, the housing 126 may include the first bearing 150, but not the second bearing 154. In that case, there may be no second bearing, or a second bearing may be provided remote from the housing, such as at a gearbox, generator or other structure to which the shaft is directly or indirectly connected.

Alternatively, the housing 126 may include the second bearing 154 but not the first bearing 150. In that case, there may be no first bearing, or a first bearing may be provided remote from the housing, such as at a hub or other structure to which the shaft is directly or indirectly connected.

Alternatively, the housing 126 may include no bearings. In that case, one or more bearings may be provided remote from the housing, such as at a generator, gearbox, hub, or other structure to which the shaft is directly or indirectly connected.

A potential advantage of the housing having one or both of the first bearing 150 and second bearing 154 is that the bearings help enclose the portion of the shaft 142 adjacent which the retention mechanism is disposed. This may reduce the need for one or more separate safety shrouds, enclosures, screens or cages.

Figure 19:
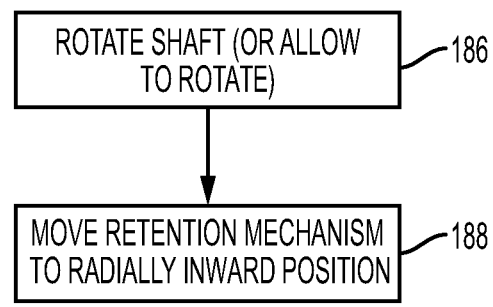
FIG. 19 is a flowchart showing a method of operating an assembly for a wind turbine, in accordance with the invention.

FIG. 19 is a flowchart showing a method of operating an assembly as defined in any of the accompanying assembly claims. While the retention mechanism is in the radially outward position, the shaft 142 is rotated 186 to a lockable position. The shaft 142 may be actively rotated (eg, with an electric motor, or manually, such as with a lever) or allowed to rotate under its own momentum. The retention mechanism is then moved 188 to the radially inward position, thereby to constrain rotation of the shaft.

The method may be used with any of the above-described embodiments.

Although the invention has been described with reference to a number of specific embodiments, the skilled person will appreciate that the invention may be embodied in many other forms.

The invention claimed is:

1. A wind turbine, comprising:
   a tower;
   a nacelle mounted on the tower, the nacelle housing a generator;
   a rotor coupled to the nacelle and being rotatable about an axis of rotation; and
   an assembly housed within the nacelle, comprising:
      a main shaft housing;
      a shaft extending within the main shaft housing and disposed between the rotor and the generator for converting energy of the rotating rotor into electricity, a radially outer portion of the shaft comprising at least one engagement formation embedded within the shaft; and
      a retention mechanism moveable radially between:
         a radially inward position in which the retention mechanism can engage the at least one engagement formation, such that rotation of the shaft is constrained; and
         a radially outward position in which the retention mechanism cannot engage the engagement formation, thereby allowing rotation of the shaft.

2. The assembly of claim 1, wherein the engagement formation comprises at least one recess in an outer surface of the shaft.

3. The assembly of claim 2, wherein the at least one recess has an interior configured to completely surround a circumference of a tip portion of the at least one retention mechanism when positioned within the at least one recess.

4. The assembly of claim 2, wherein the at least one recess comprises a plurality of recesses circumferentially spaced apart in the outer surface of the shaft.

5. The assembly of claim 2, wherein the retention mechanism includes at least one locking element, wherein:
   in the radially inward position, a portion of the at least one locking element is at least partly engaged with a corresponding one of the at least one recess; and
   in the radially outward position, the portion of the at least one locking element is disengaged from the corresponding recess.

6. The assembly of claim 5, wherein the at least one locking element is a pin.

7. The assembly of claim 6, wherein the main shaft housing comprises an aperture for the at least one pin, the at least one pin being slideably mounted within its corresponding aperture.

8. The assembly of claim 5, wherein the at least one locking element is a pawl mounted to pivot between the radially inward and radially outward positions.

9. The assembly of claim 5, wherein the at least one locking element comprises a plurality of locking elements and the at least one recess comprises a plurality of the recesses.

10. The assembly of claim 5, wherein the at least one locking element is a tapered fit in the, or at least one of, the corresponding recess or recesses.

11. The assembly of claim 10, wherein the tapered fit is in the circumferential direction, such that as the at least one locking element moves towards the radially inward position, the tapered fit causes a gradual decrease in the amount of rotational play between the shaft and the main shaft housing.

12. The assembly of claim 11, wherein when the at least one locking element is in the radially inward position, there is substantially no rotational play between the shaft and main shaft housing, at least partly as a result of the tapered fit.

13. The assembly of claim 11, wherein the tapered fit is at least partly due to a taper along at least a portion of the at least one locking element.

14. The assembly of claim 11, wherein the tapered fit is at least partly due to a taper within at least a portion of an interior of the at least one recess.

15. The assembly of claim 1, wherein the main shaft housing further comprises:
   a first bearing; and
   a second bearing axially spaced apart from the first bearing;
   wherein the shaft is at least partly supported by the first bearing and the second bearing for rotation relative to the main shaft housing, and the retention mechanism is positioned between the first bearing and the second bearing.

16. The assembly of claim 1, wherein the at least one engagement formation extends from the radially outer portion of the shaft in a radially inward direction into the shaft.

17. The assembly of claim 1, wherein the assembly further comprises an actuator fixed to a boss on the main shaft housing, the actuator being configured to selectively move the retention mechanism between the radially inward and radially outward positions.

18. A method of operating a wind turbine, comprising:
   providing the wind turbine having a tower, a nacelle mounted on the tower, the nacelle housing a generator, and a rotor coupled to the nacelle and being rotatable about an axis of rotation;
   providing an assembly housed within the nacelle and having a main shaft housing, a shaft extending within the main shaft housing and disposed between the rotor and the generator for converting energy of the rotating rotor into electricity, and a radially outer portion of the shaft comprising at least one engagement formation embedded within the shaft, and a retention mechanism moveable radially between:
      a radially inward position in which the retention mechanism can engage the at least one engagement formation, such that rotation of the shaft is constrained; and
      a radially outward position in which the retention mechanism cannot engage the engagement formation, thereby allowing rotation of the shaft;
   rotating, or allowing rotation of, the shaft to a lockable position while the retention mechanism is in the radially outward position; and
   moving the retention mechanism to the radially inward position, thereby to constrain rotation of the shaft.

19. An assembly for a wind turbine, comprising:
   a main shaft housing;
   a shaft extending within the main shaft housing, the shaft having a radially inner surface and a radially outer surface, the radially outer surface including a radially outer portion of the shaft comprising at least one engagement formation embedded within the shaft such that a base of the at least one engagement formation is located closer to the radially inner surface of the shaft than the radially outer surface of the shaft; and
   a retention mechanism moveable radially between:

a radially inward position in which the retention mechanism can engage the at least one engagement formation, such that rotation of the shaft is constrained; and
a radially outward position in which the retention mechanism cannot engage the engagement formation, thereby allowing rotation of the shaft.

\* \* \* \* \*